United States Patent

[11] 3,634,611

[72] Inventors Peter C. Pugsley
Pinner;
Mouayed Edouard Dobouney, Dartford,
both of England

[21] Appl. No. 875,664
[22] Filed Nov. 12, 1969
[45] Patented Jan. 11, 1972
[73] Assignee Crosfield Electronics Limited
London, England
[32] Priority Nov. 14, 1968
[33] Great Britain
[31] 54,038/68

[54] CATCHLIGHT CONTROL IN IMAGE REPRODUCTION SYSTEMS
5 Claims, 3 Drawing Figs.

[52] U.S. Cl. .......... 178/5.2 A
[51] Int. Cl. .......... H04n 1/46
[50] Field of Search .......... 178/5.2 A, DIG. 16

[56] References Cited
UNITED STATES PATENTS

| | | | |
|---|---|---|---|
| 2,766,319 | 10/1956 | Hall | 178/5.2 A |
| 2,872,508 | 2/1959 | Rose | 178/5.2 A |
| 2,947,805 | 8/1960 | Moe et al. | 178/5,2 A |
| 2,981,792 | 4/1961 | Farber | 178/5.2 A |

*Primary Examiner*—Robert L. Griffin
*Assistant Examiner*—Donald E. Stout
*Attorney*—Kemon, Palmer & Estabrook

ABSTRACT: To reproduce colored images, color component signals generated by scanning an original are color corrected and then tone corrected and used to control the exposure of a sensitive surface. "Catchlights" are reproduced on an extended and nonlinear portion of the tone correction characteristic. To prevent the reproduction on this portion of the characteristic of signals which do not correspond to catchlights but which, through overcorrection in the color correction circuits, have a similar signal level, a catchlight detector circuit is connected in parallel with the color correction circuit so as to receive uncorrected color component signals and to modify the response of the tone correction circuit to a signal from the color correction circuit in the presence of a catchlight signal from the catchlight detector.

Inventor
Peter C Pugsley
Mouayed E Dobbuney
By
Kemon, Palmer & Estabrook
Attorneys Inventors By Attorneys

CATCHLIGHT CONTROL IN IMAGE REPRODUCTION SYSTEMS

This invention is concerned with the reproduction of "-catchlights" in printed images. The term "catchlight" refers to the portion of a scene which catches the light and which ought to be printed as whiter than the normal white level of the image. To achieve good reproduction of catchlights there has to be a sharp change of slope in the tone reproduction characteristic beyond the normal white level.

In the electro-optical color reproduction, the image to be reproduced is normally scanned by photosensitive devices through three separate filters in turn, so that the three signals obtained represent the densities of successively scanned elements of the color separation images (normally red, blue and green). Because the printer inks are not complementary to the color filters, complex color correction operations have to be carried out. For example, if the magenta ink, which should absorb all the green light and reflect all the red and blue, absorbs some of the red light, it is carrying out the function of the cyan ink and consequently wherever magenta appears the weight of cyan ink must be reduced to an extent which, in single stage masking, is proportional to the amount of magenta present at that point. The corrected color component signals pass to a tone corrector circuit in which further compensations are made for the nonlinearities in the characteristics of the process as a whole, to control the tones in the shadow, highlight and mid-tone regions. Generally, for the reproduction of catchlights, the tone correction circuit characteristic is extended to bring about a sharp change of slope in the reproduction characteristic in the "whiter than white" region. We have found, however, that such an arrangement has certain disadvantages. In a color correction system of the kind described above, the correction applied to a color component signal may be such that it passes beyond the "white" level of the signal. Thus, in the example described above, if magenta ink is laid down at a point where the cyan requirement is at white level, then the corrected cyan signal will be at a "whiter than white" level. Such a signal is said to be overcorrected. It will now be seen that when such a signal passes through the tone correction computer it falls on the part of the characteristic having the increased slope necessary for catchlights. This is highly undesirable for overcorrected signals. According to the present invention the color correction circuit receives the uncorrected color signals from the scanner and passes color corrected signals to a tone correction circuit which provides tone corrected signals for application to an exposing scanner for exposing a sensitized surface; a catchlight detector circuit is connected in parallel with the color correction circuit to receive at its input uncorrected color signals from at least one of the color component channels and generates a catchlight output signal only when its input signal level indicates that a catchlight has been scanned; the tone correction includes a catchlight control means connected to receive the catchlight output signal and the response of the tone correction circuit to a color corrected signal from the color correction circuit is modified in the presence of a catchlight signal. Because catchlights are now detected by a circuit responsive to uncorrected color component signals, overcorrected signals pass through the tone computer without being subjected to the increased slope of the catchlight characteristic. In the preferred form of apparatus embodying the invention the catchlight detector circuit receives uncorrected color signals from each of the color component channels and generates a catchlight signal when their weighted mean value passes a predetermined reference level.

In order that the invention may be better understood, one example will now be described with reference to the accompanying drawings, in which.

Figure 1:
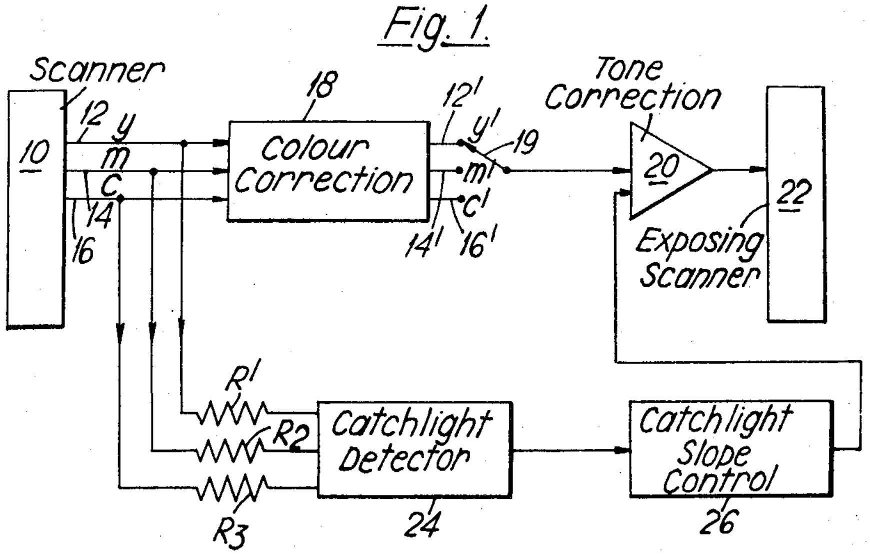
FIG. 1 illustrates in the form of a block diagram a color signal circuit embodying the invention.

In FIG. 1, a scanner 10 scans an original to be reproduced and generates three output signals on lines 12, 14 and 16 representing the blue, green and red densities of successively scanned elements of the original. These signals are used for the printer signals in the complementary subtractive color primaries, namely yellow, magenta and cyan ($v$, $m$ and $c$). Because of the color distortions inherent in the process, as explained above, the signals $y$, $m$ and $c$ are applied to a color correction circuit 18 which combines each color input signal with portions of one or more of the other signals to form color corrected printer signals $y'$, $m'$and $c'$ on the output lines 12', 14' and 16'. In the apparatus shown a selector switch applies a selected one of these signals to a tone correction circuit 20, the output of which feeds a light modulator in an exposing scanner 22 which scans a light-sensitive film to form a corrected color separation.

The uncorrected color signals $y$, $m$ and $c$ are applied through resistors R1, R2 and R3 to a catchlight detector circuit 24 which generates a signal when the levels of the three signals $y$, $m$ and $c$ in combination indicate that a catchlight is being scanned. The catchlight signal at the output of the detector circuit 24 is applied through a catchlight slope circuit 26 to the tone corrector 20.

Figure 2:
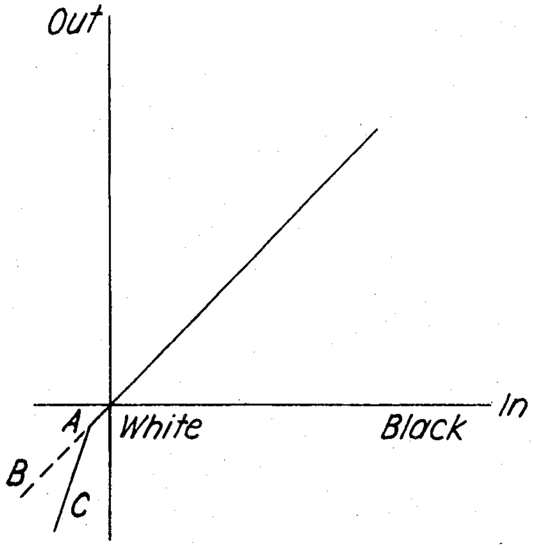
FIG. 2 is a graph illustrating the effect of the catchlight circuit.

In FIG. 2 there is shown diagrammatically the tone control characteristic of the circuit. The lower left-hand quadrant represents the "whiter-than-white" region. In this region, the catchlight slope AC is much steeper than the dotted portion AB, which is a continuation of the main part of the characteristic. The relationship between the resistors R1, R2 and R3 determines the weight allocated to each of the uncorrected signals at the input of the catchlight circuit. As an example, less weight can be placed on the yellow signals because yellow ink on white paper is nearly as bright as white. Overcorrected color signals from the color correction circuit 18 are not affected by the breakpoint A of the characteristic but will follow the dotted line AB.

Figure 3:
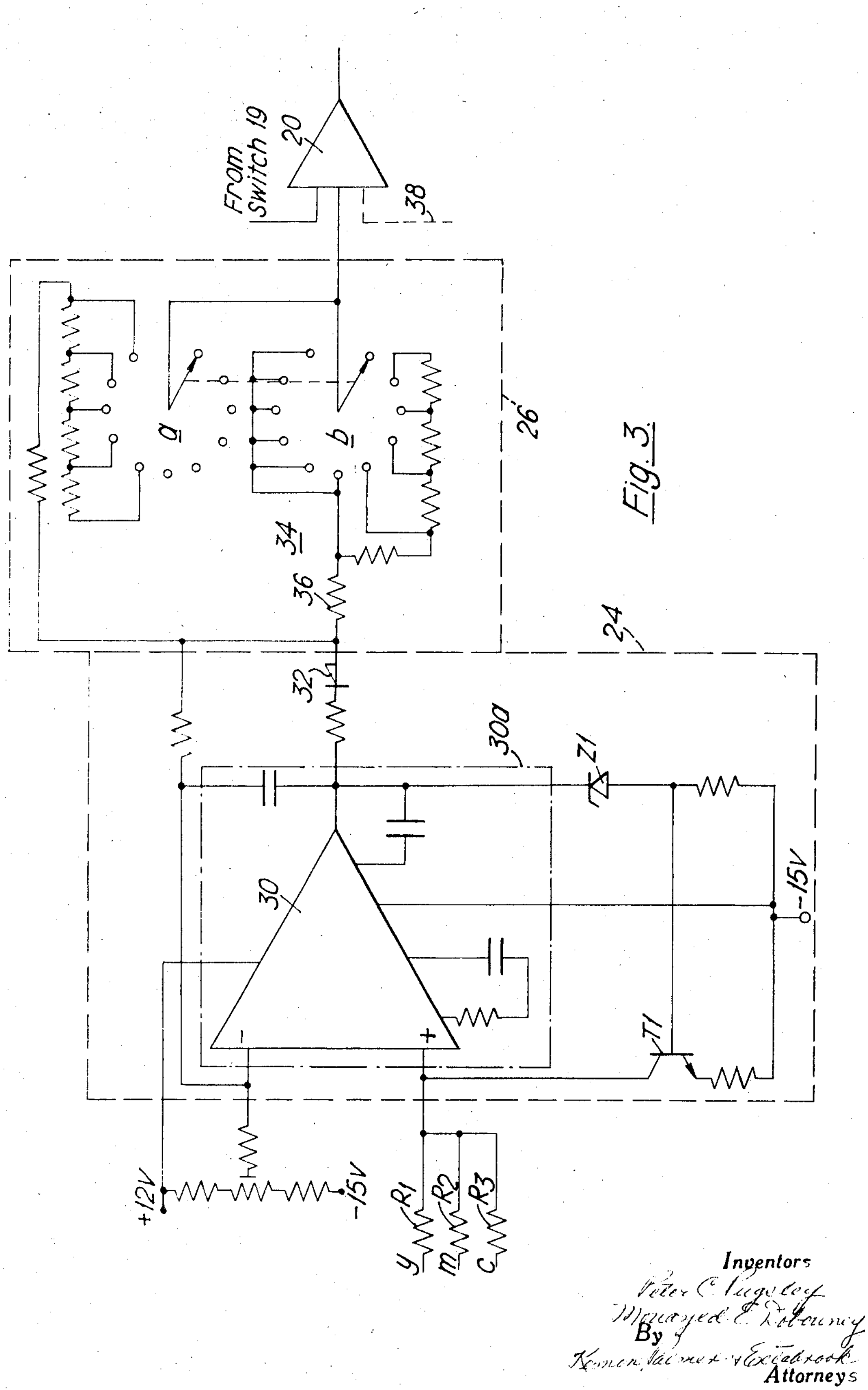
FIG. 3 shows in greater detail the catchlight detector and catchlight slope circuits.

In the circuit shown in FIG. 3 the resistors R1, R2 and R3 are fed in common to the noninverting input of a differential amplifier 30 within the catchlight detector circuit 24. The inverting input is connected to a reference potential determined by the setting of a preset potentiometer R4 which determines the position of the breakpoint A in FIG. 2. The amplifier 30 is a monolithic integrated circuit differential amplifier of the kind shown as "Type 709." For example, it may be a Type 709 differential amplifier made by Fairchild Camera and Instrument Corporation under the designation μA709C. The components shown within the chain-dotted box 30A are necessary for the high-frequency stability of the amplifier and are connected to the amplifier in a well-known manner.

The amplifier 30 "sees" the weighted mean of the signals $y$, $m$ and $c$ in proportions governed by the values of the resistors R1, R2 and R3. When this input is sufficient to indicate a catchlight, i.e., when it is more negative than the reference potential at the inverting input, an output signal appears on the far side of a diode 32 connected to the output of the amplifier 30. In the circuit shown, the effective zero is determined by the preset potentiometer R4 and it is not possible to supply negative feedback to the inverting input. As a consequence, feedback is taken to the noninverting input by way of a Zener diode Z1 and a transistor T1. The transistor T1 serves as an inverter and the Zener diode sets the level at which feedback is maintained. This catchlight signal is applied to a rotary switch 34. In the example shown, the rotary switch has two banks $a$ and $b$, the wipers of which are ganged. For any position of the wipers other than the "off" position shown, one of the wipers rests on a contact connected to a resistor. For bank $b$, the resistors connected to the contacts are themselves connected in series with one another and with a resistor 36, the other end of which is connected to the output or anode of the diode 32. When the wiper of bank $b$ is on one of these contacts the wiper of bank $a$ is on an unconnected contact. Thus, for these positions, the switch 34 connects additional resistance in series with resistor 36 between the diode 32 and the input of the tone control amplifier 20.

The resistors connected to contacts of bank *a* of switch 34 are themselves connected in series and the end of the series chain of resistors is connected directly to the output of the diode 32. When the wiper of bank *a* is on one of these contacts, the wiper of bank *b* is connected through resistor 36 to diode 32. Consequently, for such connections one or more of the resistors connected to bank *a* is electrically connected in parallel with resistor 36 between the diode 32 and the tone correction amplifier 20. The switch 34 and the associated resistors constitute the catchlight slope control circuit 26.

With the switch 34 in its midposition, the catchlight slope is determined by the resistor R36. This may conveniently be mounted on a plug-in carrier and its value chosen to suit proven requirements when the apparatus is installed. Thereafter the operator can adjust the catchlight slope by means of switch 34 to give a greater or lesser slope than the predetermined value when circumstances require but he can return rapidly to the preset value selected upon installation whenever he wishes.

In the tone control circuit 20, the catchlight signal is added to the signal from the switch 19 (FIG. 1). If desired, additional signals may be added at this point. For example, signals permitting increase or decrease of color highlights (which are not catchlights) can be introduced on the dotted input connector 38.

The analyzing scanner 10 and the exposing scanner 22 may be of conventional form; their design does not form part of the present invention.

The circuit is capable of numerous modifications; for example, with a different output circuit for the amplifier 30, the feedback could be taken to its inverting input without the need for an inverting transistor in the feedback path.

We claim:

1. Apparatus for preparing color printers for use in reproducing colored originals, including scanning means for scanning an original to be reproduced, element by element, and generating individual electric signals varying with the densities of different color components of the successively scanned elements of the originals; a color correction circuit connected to receive the uncorrected color signals from the scanner and a tone correction circuit connected to receive color corrected signals from the color correction circuit and to provide tone corrected signals for application to an exposing scanner for exposing a sensitized surface; a catchlight detector circuit connected in parallel with the color correction circuit to receive at its input uncorrected color signals from at least one of the color component channels and generating an output signal only when its input signal level indicates that a catchlight has been scanned; the tone correction circuit including a catchlight control means connected to receive the said output signal, for modifying the response of the tone correction circuit to a color corrected signal from the color correction circuit in the presence of said output signal.

2. Apparatus in accordance with claim 1, in which the catchlight detector circuit is connected to receive uncorrected color signals from all the color channels and generates a catchlight output signal only when a weighted mean of the uncorrected color signals exceeds a predetermined reference value.

3. Apparatus in accordance with claim 1, including a catchlight slope control circuit comprising a manually adjustable control, a fixed resistor connected in circuit in an intermediate position of the control and resistive means effective in the positions on opposite sides of the central position for increasing or decreasing the effective resistance in circuit and thereby the slope of the catchlight characteristic.

4. Apparatus in accordance with claim 3, in which the fixed resistor is mounted on a plug-in carrier.

5. Apparatus in accordance with claim 3, in which said manually adjustable control includes a switch contact in said central position and switch contacts on opposite sides of said central position, and in which said resistive means on one side of said central position of said control is connected in series with said fixed resistor and the corresponding switch contact and said resistive means on the other side of said central position of said control is connected in parallel with said fixed resistor.

* * * * *